United States Patent [19]
Zhang

[11] Patent Number: 5,603,672
[45] Date of Patent: Feb. 18, 1997

[54] METHOD FOR CONTROLLING THE OUTPUT TORQUE OF AN AUTOMATIC TRANSMISSION

[75] Inventor: Hong Zhang, Schwieberdingen, Germany

[73] Assignee: Robert Bosch GmbH, Stuttgart, Germany

[21] Appl. No.: 446,864

[22] PCT Filed: Sep. 28, 1994

[86] PCT No.: PCT/DE94/01138

§ 371 Date: Jun. 5, 1995

§ 102(e) Date: Jun. 5, 1995

[87] PCT Pub. No.: WO95/09741

PCT Pub. Date: Apr. 13, 1995

[30] Foreign Application Priority Data

Oct. 5, 1993 [DE] Germany ................ 43 33 899.2

[51] Int. Cl.⁶ .................. B60K 41/06; B60K 26/00
[52] U.S. Cl. .................. 477/110; 477/121; 477/156
[58] Field of Search .................. 677/70, 77, 78, 677/110, 111, 121, 143, 156

[56] References Cited

U.S. PATENT DOCUMENTS

| | | | |
|---|---|---|---|
| 4,891,759 | 1/1990 | Kato | 364/424.1 |
| 5,070,746 | 12/1991 | Milunas et al. | 477/154 |
| 5,325,740 | 7/1994 | Zhang et al. | 473/110 |
| 5,383,824 | 1/1995 | Runge et al. | 477/110 |
| 5,407,401 | 4/1995 | Bullmer et al. | 477/110 |
| 5,436,834 | 7/1995 | Graf et al. | 477/121 X |

FOREIGN PATENT DOCUMENTS

| | | |
|---|---|---|
| 0234685 | 9/1987 | European Pat. Off. |
| 0482689 | 4/1992 | European Pat. Off. |
| 4309903 | 5/1994 | Germany |

Primary Examiner—Khoi Q. Ta
Attorney, Agent, or Firm—Walter Ottesen

[57] ABSTRACT

The invention relates to a method and an apparatus for controlling the output torque ($M_{ab}$) of an automatic transmission 10 during the course of a gear-shifting operation in an engine-operated vehicle. The transmission 10 has at least two gears (11, 12) which can be engaged alternatively by means of clutches (16, 17). The clutches (16, 17) and the torque ($M_m$) of the vehicle engine 14 are controlled according to at least two control sequences (SH1 to SH3, SR1 to SR3 or ZH, ZR) which can be selected as a function of instantaneously present gear-shifting conditions. According to the invention, in order to select the control sequences (SH1 to SH3, SR1 to SR3 or ZH, ZR) it is determined, as a gear-shifting condition, whether the vehicle is in an operating state with a positive clutch torque (engine traction operation) or in an operating state with a negative clutch torque (engine overrun operation).

14 Claims, 9 Drawing Sheets

METHOD FOR CONTROLLING THE OUTPUT TORQUE OF AN AUTOMATIC TRANSMISSION

BACKGROUND OF THE INVENTION

From United States patent application Ser. No. 08/050,085, filed Apr. 28, 1993, and U.S. Pat. No. 5,325,740, it is known to maintain the output torque of an automatic transmission at the same level before and after a gear-shifting operation of the automatic transmission by means of a deliberate control of the engine torque, provided the driver command does not change during the shifting of the gear. The term "output torque" used herein refers to the output torque of the transmission. The output torque and thus the traction force at the drive wheels is controlled in such a way that it is, within wide limits, independent of the gear just engaged or the state of the converter lockup clutch. This method is known under the name "Mastershift". With the aid of this known control function, the gear-shift points of the automatic transmission can be positioned in areas which are optimal for consumption without at the same time having to accept losses in terms of handling and the ability to meter traction force. However, the known control function relates exclusively to the control of the output torque outside the gear-shifting operations.

In United States patent application Ser. No. 08/157,993, filed Nov. 26, 1993, a method and an apparatus for controlling a vehicle are described in which an interface is defined between different subsystems (of which one is an engine control system) toward the engine control system. This interface operates on the basis of the torque produced by the engine and the subsystems exchange via the interface information relating to this torque in order to control the vehicle.

U.S. Pat. No. 5,407,401 discloses how the clutches of the automatic transmission and the torque of the engine of the vehicle can be controlled so that the output torque after the gear-shifting operation is approximately the torque present before the gear-shifting operation. For this purpose, various control sequences are provided depending on whether the operation is a shifting-up or shifting-down operation. It is essential here that the control sequences described for keeping the output torque constant during gear-shifting operations only apply when the vehicle is in an operating state with a positive clutch torque. Such an operating state with positive clutch torque occurs during a so-called engine traction operation, that is, the vehicle is driven on the basis of the engine torque.

Furthermore, it is known that, in addition to the above-mentioned engine traction operation, operating states with a negative clutch torque can also be present in a vehicle. In such engine overrun operating modes, the engine is driven by the wheels of the vehicle. The engine then supplies an engine braking torque.

The object of the present invention is to ensure optimum control of the output torque during gear-shifting problems of an automatic transmission in all operating states.

SUMMARY OF THE INVENTION

The invention is based on a control of the output torque of an automatic transmission during the course of a gear-shifting operation. The automatic transmission has at least two gears which can be engaged alternatively by means of clutches. In order to control the output torque, the clutches and the torque of the vehicle engine can be controlled according to at least two control sequences which can be selected as a function of the instantaneously present gear-shifting conditions. According to the invention, in order to select the control sequences, it is determined as a gear-shifting condition whether the vehicle is in an operating state with a positive clutch torque (engine traction operation) or in an operating state with a negative clutch torque (engine overrun operation).

The positive or negative clutch torque can be determined, for example, in such a way that an indicated actual engine torque is estimated from the engine rpm and the engine load taking into account the ignition angle and cylinder shut-offs which may have been actuated. The engine braking torque can be estimated from the engine load, the engine rpm and the engine temperature. The entire torque loss results from the estimated engine braking torque and the torque demand of the auxiliary units (for example, climate system). The instantaneous clutch torque results from the difference between the indicated actual engine torque and the entire torque loss.

Another method of determining the positive or negative clutch torque comprises measuring the clutch torque with a torque sensor at the drive shaft of the vehicle.

The subject of the above-mentioned U.S. Pat. No. 5,407,401 is the control of the output torque during an ongoing gear-shifting operation during engine traction operation. For the case of engine overrun operation, that is, when a negative clutch torque occurs, the control which is gear-shifting operation, with its minimum torque to be generated or has a torque which is greater than the minimum torque to be generated. In the first case, a fuel supply shut-off (overrun shutoff) is normally operating before or after the gear-shifting operation; while, in the other case, the metering of fuel is maintained. If these different facts are considered in the selection of the control sequences, sequences are arrived at which are even better matched to the particular operating state.

Furthermore, it can be provided that the engine torque, which is desired after the end of the gear-shifting program, can be specified at the start of the gear-shifting program by an accelerator pedal actuated by the driver of the vehicle. In the above-mentioned so-called Mastershift method, the driver presets, by means of the accelerator pedal, a desired input drive torque or transmission output torque. Outside of gear-shifting operations, this input drive torque desired by the driver can be converted into a desired engine torque by means of the known transmission ratio and, if appropriate, taking into account the converter slippage. If it is considered that during the generally very short shifting times of automatic transmissions the driver command regarding the input drive torque does, in general, not change significantly, the engine torque desired after the end of the gear-shifting operation can be determined with sufficient accuracy by the input drive torque, specified by the driver at the start of the gear-shifting operation. This has the advantage that during the gear-shifting operation the input drive torque desired by the driver does not have to be continuously observed or measured and adjusted.

Furthermore, it is advantageous to determine as further gear-shifting conditions whether the gear-shifting operation to described in this application is not suitable for controlling the output torque during the gear shifting operation. The advantage of the invention consists in the fact that a control of the output torque is provided even in the case of a negative clutch torque (engine overrun operation) and the appropriate control sequence is selected depending on whether the vehicle is in the operating state with positive clutch torque or in the operating state with negative clutch torque. In this way, an optimum control of the output torque in all operating conditions of the vehicle is ensured.

In particular, it is provided to maintain the output torque essentially constant during the gear-shifting operation. In the presence of specific operating conditions before or after a gear-shifting operation, the output torque cannot be kept constant; however, by means of the control according to the invention, a jolt-free and gentle transition between the different output torques is made possible.

An advantageous embodiment of the invention provides, in the case of the presence of the operating state with negative clutch torque (engine overrun operation), to determine as additional gear-shifting condition whether a desired engine torque after the finishing of the gear-shifting operation is greater than the minimum engine torque to be generated. The control strategy which is optimal for the respective operating state is selected as a function of this additional gear-shifting operation from the control sequences which are assigned to the operating states with a negative clutch torque. As a result, it is possible to arrive better at the control sequence adapted to the particular operating state. In operating states with negative clutch torque it is possible that the engine operates, before or after the be controlled is a shifting-up operation from a first transmission ratio to a second transmission ratio or a shifting-down operation from a second transmission ratio to a first transmission ratio.

As an additional further gear-shifting criterion it can be determined whether the instantaneous engine torque at the start of the gear-shifting operation is greater than the minimum engine torque to be generated. It is possible to select the control sequences as a function of this additional gear-shifting condition. In this advantageous embodiment of the invention, allowance is also made for the fact that at the start of the gear-shifting operation in operating states with negative clutch torque either the engine has its minimum engine torque to be generated or has a torque which is greater than the minimum torque.

It is further advantageous that a first control sequence is selected if a shifting-up operation from a first transmission ratio to a second transmission ratio is detected and the engine torque desired after finishing the gear-shifting operation is greater than or equal to the minimum engine torque to be generated and/or a second control sequence is selected if a shifting-up operation from a first transmission ratio to a second transmission ratio is detected, and the engine torque desired after finishing the gear-shifting operation is less than the minimum engine torque to be generated, and/or a third control sequence is selected if a shifting-down operation from a second transmission ratio to a first transmission ratio is detected and the engine torque present at the start of the shifting operation is equal to the minimum engine torque to be generated, and the desired engine torque after finishing the gear-shifting operation is less than the minimum engine torque to be generated, and/or a fourth control sequence is selected if a shifting-down operation from a second transmission ratio to a first transmission ratio is detected and the engine torque present at the start of the shifting operation is equal to the minimum engine torque to be generated and the engine torque desired after finishing the gear-shifting operation is greater than the minimum engine torque to be generated, and/or a fifth control sequence is selected if a shifting-down operation from a second gear-shifting ratio to a first gear-shifting ratio is detected and the engine torque present at the start of the gear-shifting operation is greater than the minimum engine torque to be generated.

BRIEF DESCRIPTION OF THE DRAWINGS

The invention will now be described with reference to the drawings wherein.

DESCRIPTION OF THE PREFERRED EMBODIMENTS OF THE INVENTION

The invention will now be explained in greater detail with reference to the exemplary embodiments described below.

Figure 1:
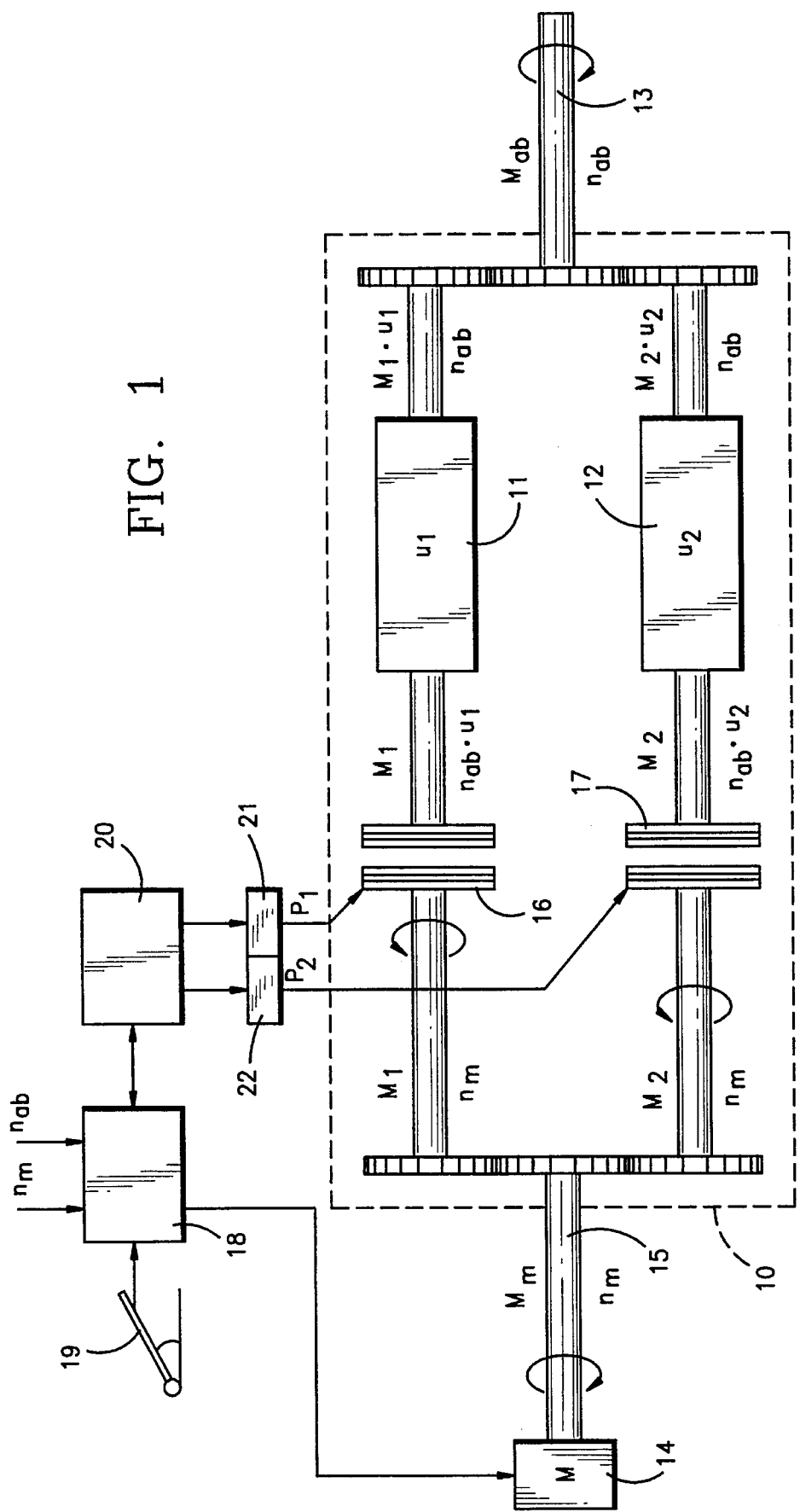
FIG. 1 shows schematically a block circuit diagram.

In FIG. 1, an automatic multistage transmission 10 is shown schematically. The transmission has two gears or gear stages which are identified in the following description as first gear 11 and second gear 12. The transmission ratio of the first gear 11 is $u_1$, that of the second gear 12 is $u_2$. The gearwheels necessary to achieve such transmission ratios and their engagement in one another are illustrated as a rectangular block for the sake of simplification. The two gears 11 and 12 are combined to form a common output shaft 13 by means of which the wheels of the vehicle are driven, if required, by means of differential gearing in a manner not illustrated. The output torque is $M_{ab}$ and the output speed $n_{ab}$. The multistage transmission 10 is driven by an engine 14 via a drive shaft 15. The engine 14 transmits the engine torque $M_m$ and the engine speed $n_m$ to the multistage transmission 10. This engine is, in general, an internal combustion engine such as a spark-ignition engine or a diesel engine but can, in principle, also be an electric motor. The drive shaft 15 is connected to the two gears 11 and 12 via two clutches 16 and 17. For the sake of clarity, only a two-shaft transmission is shown in this embodiment, but it is also possible to realize the invention with a larger number of shafts or as planetary transmission.

Generally, a converter (not shown in FIG. 1) is connected between the engine 14 and the automatic transmission 10. This converter can be bypassed in most systems by means of a clutch. The following descriptions apply to gear-shifting operations in which this converter clutch is closed. If the gear-shifting operations take place with an open converter clutch, the turbine torque takes the place of the engine torque and the turbine speed takes the place of the engine speed. Therefore, if the terms "engine torque" and "engine speed" are used below, they should also be understood to include the turbine torque and the turbine speed with an open converter clutch.

In order to control the engine 14, an electronic engine control device 18 is provided by means of which the engine 14 is controlled, in a manner known per se, by closed-loop or open-loop control of the ignition and/or the metering of air and/or fuel. This can take place by means of a pregiven function or characteristic fields. The driver command regarding the output torque, the engine power or the speed of the vehicle are specified via an accelerator pedal 19 which can be activated by the driver. Furthermore, at least the engine speed $n_m$ is pregiven to the engine control device 18. The influence of further parameters is not illustrated here for the sake of simplification.

An electronic transmission control device 20 is connected to the engine control device 18 and controls two pressure controllers 21 and 22 in order to generate the clutch pressure $P_1$ and $P_2$ for the two clutches 16 and 17. The particular clutch, which is closed, determines the gear and a gear-shifting operation is principally carried out by releasing this clutch and closing another clutch for another gear. This is described in greater detail below.

For the sake of simplification, only two gears 11 and 12 are illustrated, but the automatic multistage transmission 10 can of course also have a larger number of gears. However, it is sufficient to show two gears in order to explain the gear-shifting operation according to the invention.

The engine control device 18 and the transmission control device 20 are usually configured as computer controls with control data stored in characteristic fields. The computer controls can be configured separately or as a single computer. The flowchart which can be seen in FIG. 2 constitutes the core of the invention. After the starting step 201, it is inquired in inquiry 202 whether the transmission 10 is to be shifted or not. The gear-shifting conditions are generally determined here by criteria which are known per se. Thus, the shift points can be determined as a function of the engine load and the vehicle speed or as a function of the engine load and the vehicle speed or as a function of the maximum engine torque and the drive torque command which is specified by the driver. If there is no gear-shifting operation intended, the end 206 is activated directly in the next step. However, if a gear-shifting operation is intended, it is determined in step 203 whether the vehicle is operating in the engine traction operation or in the engine overrun operation. If the vehicle is operating under engine traction conditions, the control sequences ZH or ZR are selected in step 204 depending on whether a shifting-up or shifting-down operation is desired. These control sequences can be found, as mentioned, in U.S. Pat. No. 5,407,401. If it is now determined that the vehicle is in engine overrun operation, different control sequences are selected in step 205. After the selection of the control sequences, the final step 206 is reached. The entire cycle is run through continuously while the vehicle is operating.

The determination whether engine traction operation is present or not (step 203) is made by determining the coupling torque at the start of gear shifting. For this purpose, an indicated actual engine torque mo_act is estimated from the engine speed and the engine load taking into account the ignition angle and cylinder shut-offs which may have occurred. The engine braking torque mo_brake can be estimated from the engine load, the engine speed and the engine temperature. For this purpose, it is referred to United States patent application Ser. No. 08/157,993, filed Nov. 26, 1993 mentioned at the beginning. The entire torque loss mo_loss is composed of the engine braking torque mo_brake and the torque demand mo_aux of the auxiliary units (for example, climate control system).

mo_loss=mo_brake+mo_aux

The estimated actual clutch torque mo_clutch act is obtained as follows:

mo_clutch act=mo_act−(mo_brake+mo_aux)

If mo_clutch_act<0 at the start of shifting, then the clutch torque is negative and engine traction operation is not present, if mo_clutch_act>0, then the clutch torque is positive and engine traction operation is present.

Another method of determining positive or negative clutch torque consists in measuring the clutch torque with a toque sensor at the drive shaft of the vehicle.

Figure 2:
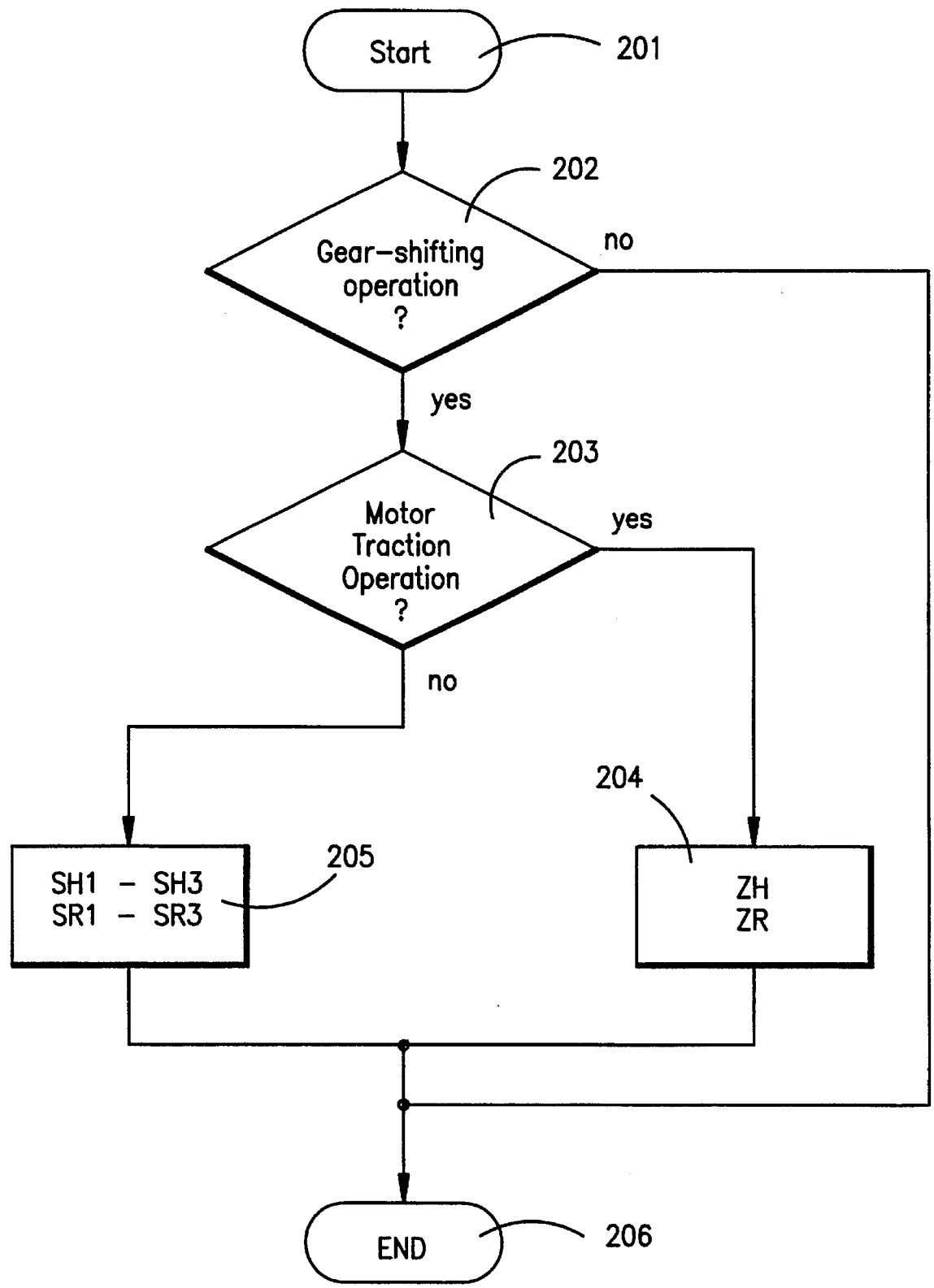
FIGS. 2 and 3 show flowcharts and FIGS. 4 to 9 show curves of torque, pressure and engine speed.
Figure 3:
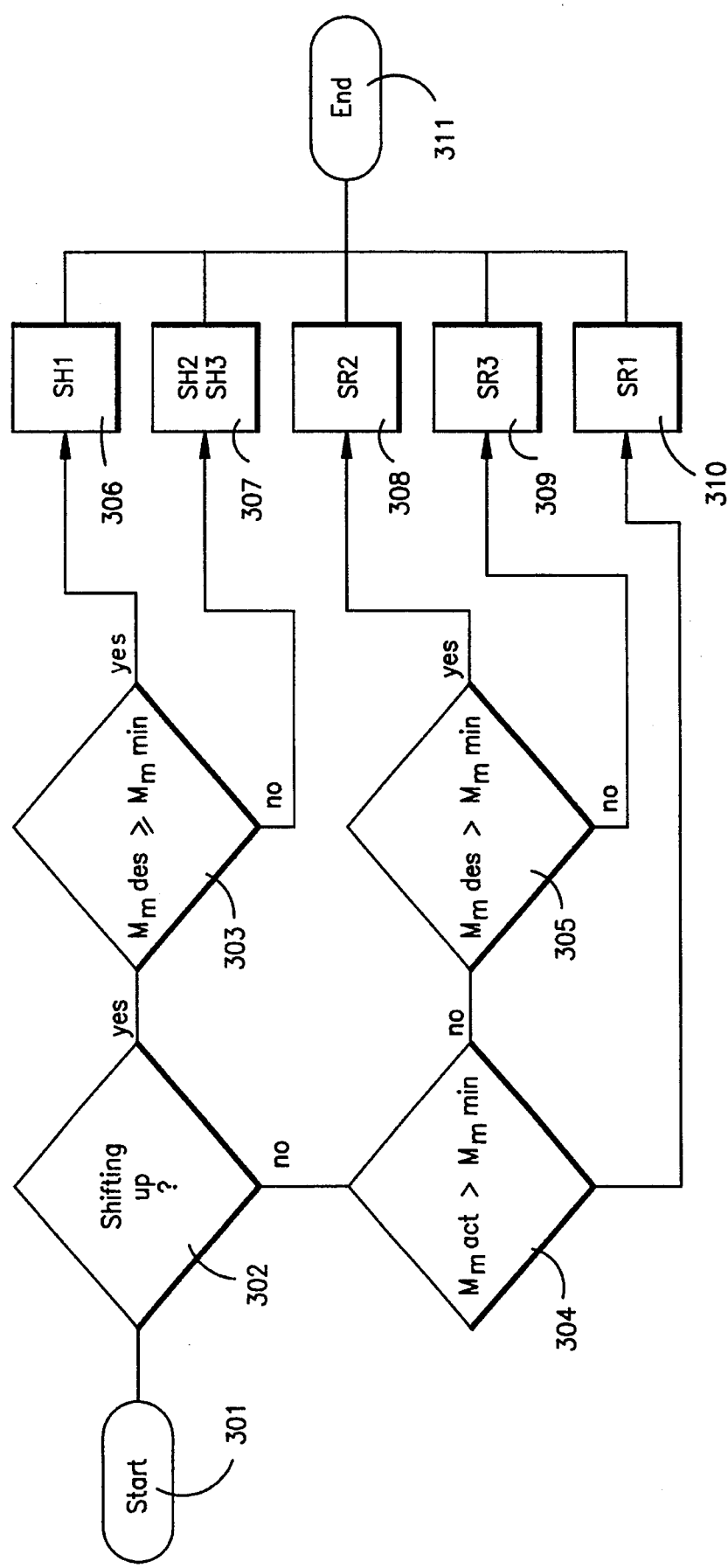

In FIG. 3, it is now explained in greater detail with reference to a flowchart how, in the case of engine overrun operation being detected (step 203 of FIG. 2), the individual control sequences are assigned to the gear-shifting conditions in step 205 (FIG. 2). After the starting step 301, an inquiry is made in a first step 302 whether the intended gear-shifting operation is a shifting-up or shifting-down operation. If it is a shifting-up operation, then it is determined in step 303 whether the engine torque $M_{m\ des}$ desired after finishing the gear-shifting operation is greater than the minimum engine torque $M_{m\ min}$. The engine torque $M_{m\ des}$ desired after the gear-shifting operation can be determined at the start of the shifting of the gear from the drive torque desired by the driver by actuating the accelerator pedal and the gear transmission ratio of the target gear. This will be explained in greater detail during the course of this exemplary embodiment. If it is determined in step 303 that after gear shifting the engine torque is greater than the minimum engine torque, the control sequence SH1 is selected in step 306. This control sequence SH1, like the control sequences described below, is explained in greater detail in the further exemplary embodiment. If the engine torque desired after gear shifting is less than the minimum engine torque, then the control sequence SH2 or SH3 (step 307) is selected. If the intended gear-shifting operation is a shifting-down operation, an inquiry is made in step 304 whether the instantaneous engine torque $M_{m\ act}$ is greater than the minimum engine torque $M_{m\ min}$. If the engine torque at the start of the gear-shifting operation is above the minimum engine torque, then the control sequence SR1 is selected in step 310. If the engine torque is already at its minimum value at the start of the shifting gear, that is, an overrun cutoff has already taken place, for example, at the start of gear shifting, an inquiry is made in step 305 whether the engine torque after the gear shifting $M_m$ des is greater than the minimum torque $M_{m\ min}$ of the engine. Therefore, if the engine torque is at its minimum value both at the start of the gear shifting and at the end of gear shifting, then the control operation SR3 is selected in step 309. However, if the engine torque is at its minimum value at the start of the gear-shifting operation but exceeds this minimum value after the gear shift occurs, then the control sequence SR2 is selected in step 308. After the final step 311, the sequence which can be seen in FIG. 3 is started again if engine overrun conditions are determined during a subsequent gear-shifting operation in step 203 (FIG. 2).

The individual control sequences are described in detail below with reference to FIGS. 4 to 9.

a) Shifting up

Case 1 (Control sequence SH1):

The control sequence SH1 (step 306 in FIG. 3) applies during engine overrun operation if the engine torque $M_{m\ des}$ after the gear shift is greater than the minimum engine torque $M_{m\ min}$ (corresponds to the engine brake torque), that is, $$M_{m\ des} = M_2 = (1/u_2) * M_{ab} \geq M_{m\ min} \qquad (1)$$

As already described, FIG. 1 shows the equivalent circuit diagram of a power shift transmission having two gears. The starting point is the first gear selected, the full torque being transmitted via the clutch 16 which operates without slippage. Before the gear shift (up to time $t_1$ in FIG. 4), an engine torque of $$M_m = M_1 = (1/u_1)*M_{ab} \quad (2)$$

is required when a negative output torque $M_{ab}$ is desired, wherein $u_1$=transmission ratio of the first gear.

For shifting up, in the first phase (starting from $t_1$) the first clutch 16 must slip and the engine rpm will change, as a result of the braking engine, from the synchronous rpm $n_1$ of the first gear to the synchronous rpm $n_2$ of the second gear. The pressure in the clutch 16, which transmits the torque $M_1$, is now reduced to the value:

$$P_1 = P_1(-M_1) \quad (3)$$

This is the pressure which would be required to transmit the torque $M_1$ when the clutch 16 is slipping.

The engine torque is reduced in comparison with the equation (2) by an amount $\Delta M_m$ $$M_m = M_1 - \Delta M_m \quad (4)$$

wherein $\Delta M_m$ is proportional to $(n_m - n_2)$ so that the engine rpm changes quickly and smoothly as a result of the control of the speed from $n_1$ to $n_2$. Here, it is referred to German patent application P 4,309,903.3, which has such an engine speed control during a gear-shifting operation as its subject.

However, since the transition from static friction to sliding friction of the clutches is usually associated with a hysteresis, the value given by the equation (3) initially briefly has a negative value $\Delta p$ superimposed on it.

Figure 4:
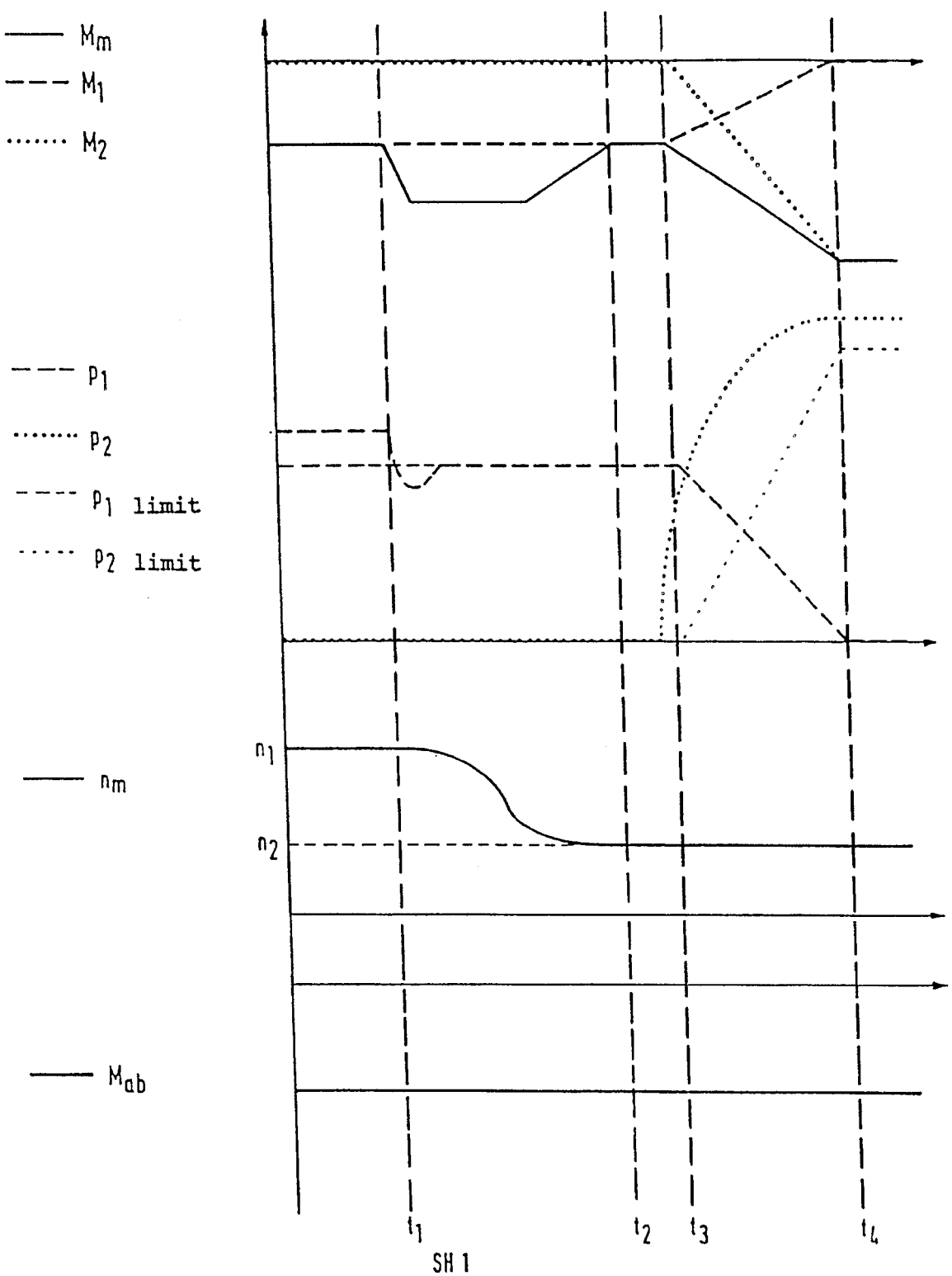
Figure 5:
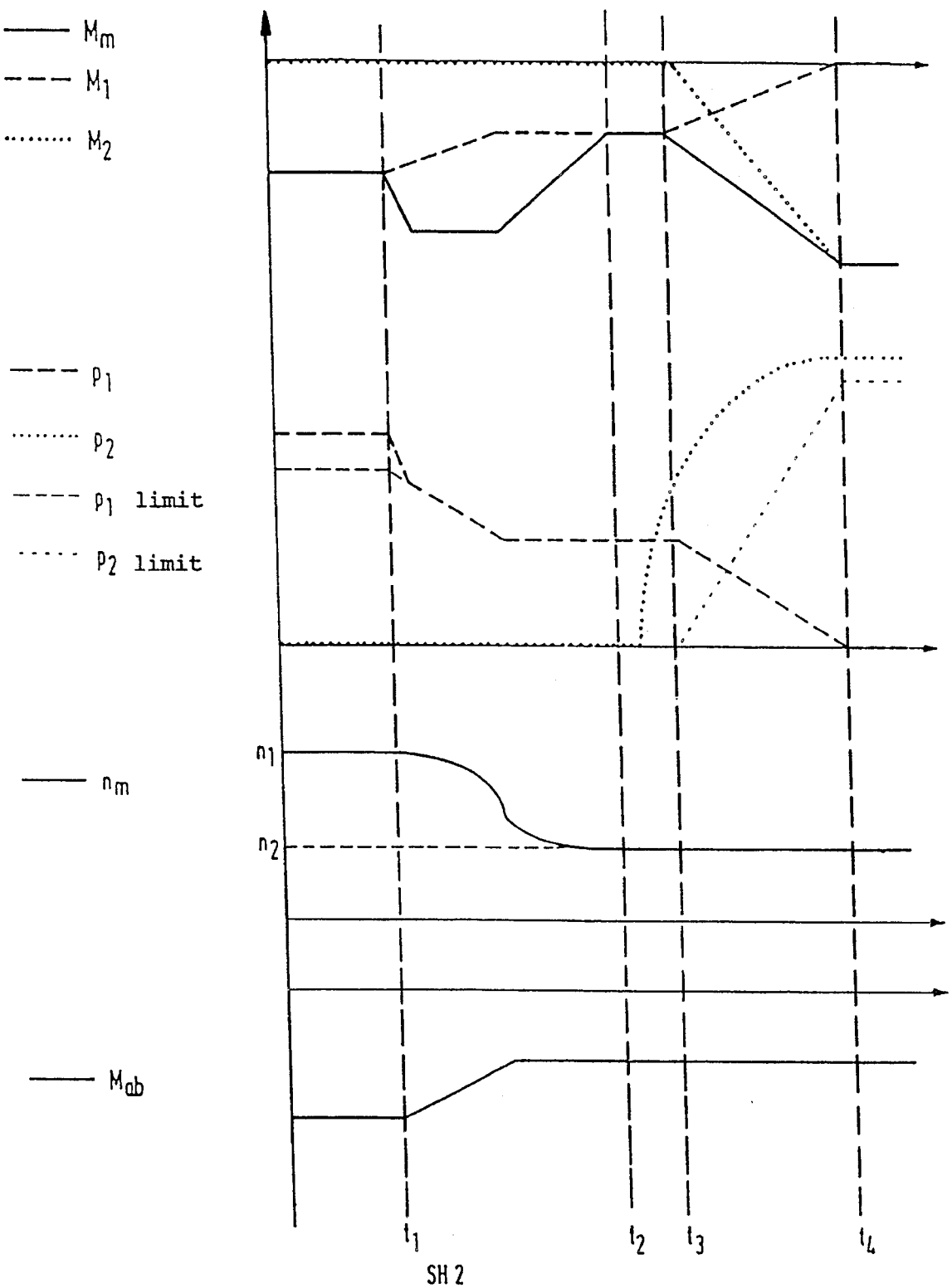

This can be seen in the second diagram of FIG. 4 just after the time $t_1$.

When the new synchronous rpm $n_2$ is reached, the clutch 17 is closed by applying a pressure $P_2$. Since the clutch 16 still takes up the full torque and the engine speed $n_m$ is practically the same as the synchronous speed $n_2$, the engagement of the clutch takes place practically without jolt. The clutch 17 is to change to static friction as quickly as possible, that is, it should operate without slipping. The pressure $P_2$ must therefore be selected according to $$P_2 > P_{2\ haft}(-M_2) \quad (5)$$

wherein, in the initial phase, $M_2 = 0$. Now, the clutch 17 must take up the negative torque. This takes place by $M_1$ being pregiven according to a function $$M_1(t) = g(t)*(1/u_1)*M_{ab} \quad (6)$$

wherein $g(t)$ is a function of that time which has the value of 1 directly after the closing of the clutch 17 and subsequently drops continuously to the value 0 at which it then remains. From this results, according to $$P_1(t) = P_1[-M_1(t)] \quad (7)$$

a variation over time of $P_1(t)$ which is applied to the pressure controller for the clutch 16.

The output torque $M_{ab}$ is made up of the torques $M_1$ and $M_2$ and the corresponding transmission ratios according to $$M_{ab} = (M_1*u_1) + (M_2*u_2) \quad (8)$$

Furthermore, with an engine speed $n_m$ which is assumed to be constant (which is justified because of the clutch 17 which is operating without slippage and the output speed which is only varying slowly in comparison with the gear-shifting operations) the following torque balance applies $$M_m = M_1 + M_2 \quad (9)$$

In the equation system (8) and (9), $M_1$ is defined according to equation (6). $M_{ab}$ is specified by the driver command. Thus, the desired value for the engine torque $M_m$ and the reaction variable $M_2$ which is obtained with this can be calculated from this equation system:

$$M_m = (1/u_2)*M_{ab} + [1 - (u_1/u_2)]*M_1 \quad (10)$$

$$M_2 = (1/u_2)*M_{ab} - (u_1/u_2)*M_1 \quad (11)$$

The shift operation is finished at the time $t_4$ when $M_1$ has climbed to 0 and thus $P_1$ has dropped to 0. The variation over time of the variables $P_1$, $M_1$, $P_2$, $M_2$, $M_m$, $M_{ab}$ and of the engine speed $n_m$ is given in FIG. 4 assuming a linear relation between pressure and torque at the clutches burdened with slippage (for example, $M_1 = -k_1 * p_1$) and assuming a function $g(t)$ which decreases linearly from 1 to 0.

Case 2 (control sequence SH2):

If the condition of the equation (1) no longer applies, after the shift operation, the engine goes into the operating state in which the engine torque is equal to the minimum engine torque. In this case, and also in the case in which the engine has its minimum torque before and after the gear shift, it is no longer possible to maintain the output torque constant during the gear-shifting operation. Instead, the output torque will increase after the gear change. The transmission must be controlled as follows so that the gear change is jolt free and there is then a transition of the output torque from the value before the gear change to the value after the gear change. This can be seen in FIG. 5.

The pressure in the clutch 16 is lowered already in the first phase starting from the time point $t_1$. This takes place in that $M_1$ is pregiven according to a function $$M_1(t) = g(t)*(M_{ab}/u_1) + [1-g(t)]*M_{min}*u_2/u_1 \quad (12)$$

with $g(t)$ dropping over time from 1 to 0. This results, according to equation (7), in a variation of $P_1$ over time.

The control of the engine torque is as described in the equation (4) with $M_1$ from the equation (12). In this first phase, the engine speed changes, as a result of the decrease of $P_1$ and the reduction of $M_m$, from the synchronous speed $n_1$ of the first gear to the synchronous speed $n_2$ of the second gear. The further steps are to be selected as in Case 1.

Figure 6:
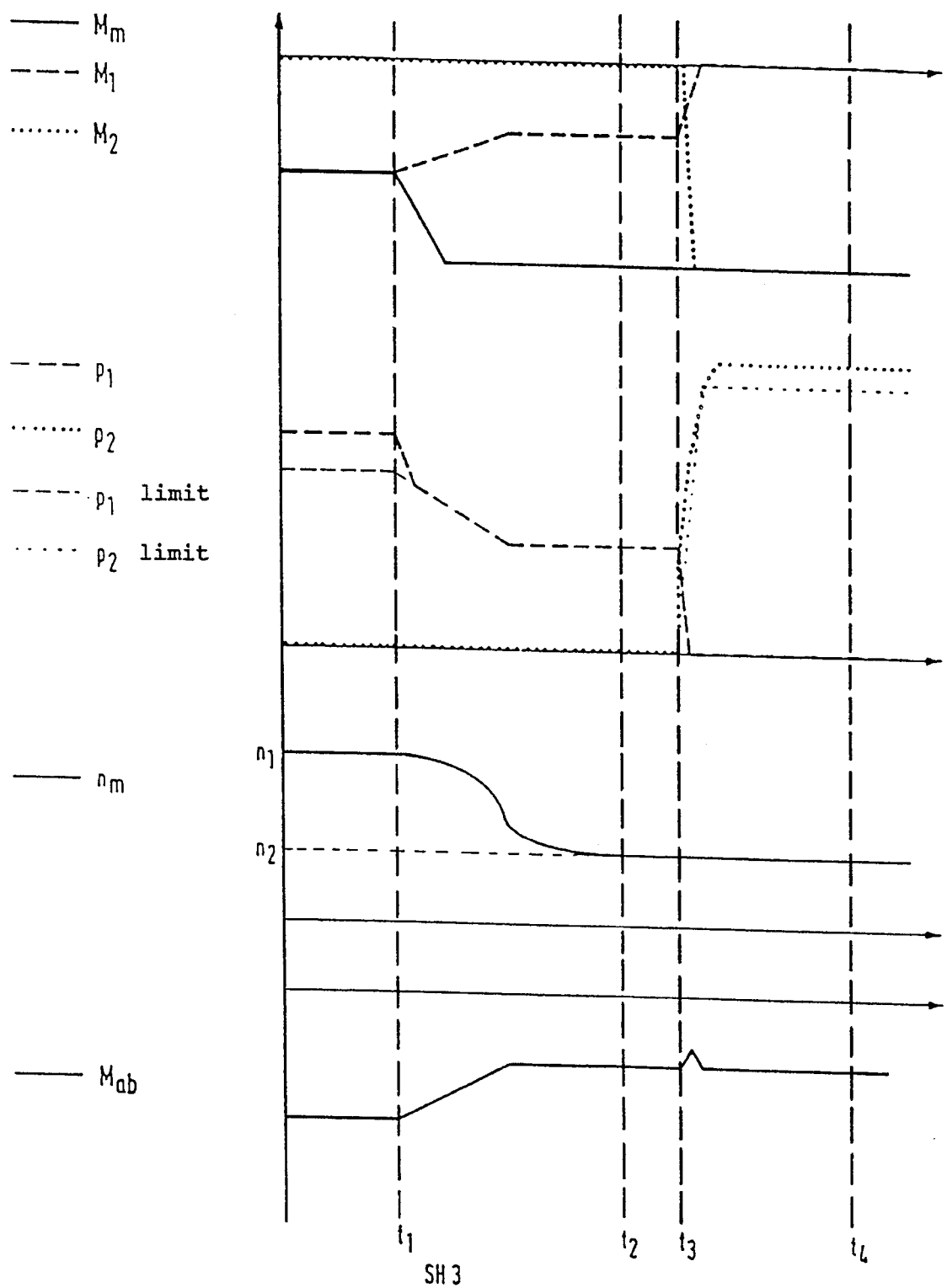

An alternative control sequence SH3 is illustrated in FIG. 6. In order to reduce pressure, $M_1$ is pregiven in a way identical to that described in the equation (12). At the same time, the engine torque is reduced according to $$M_m = g_1(t)*(M_{ab}/u_1) + [1-g_1(t)]*M_{min} \quad (13)$$

to $M_{m\ min}$, with $g_1(t)$ dropping over time from 1 to 0. The difference in torque between $M_m$ and $M_1(t)$ brings about the reduction in the engine speed $n_m$. The actual output torque $M_{ab\ act}$ increases as a function of $M_1(t)$ from equation (12) according to $$M_{ab\ act} = M_1(t)*u_1 \quad (14)$$

Figure 7:
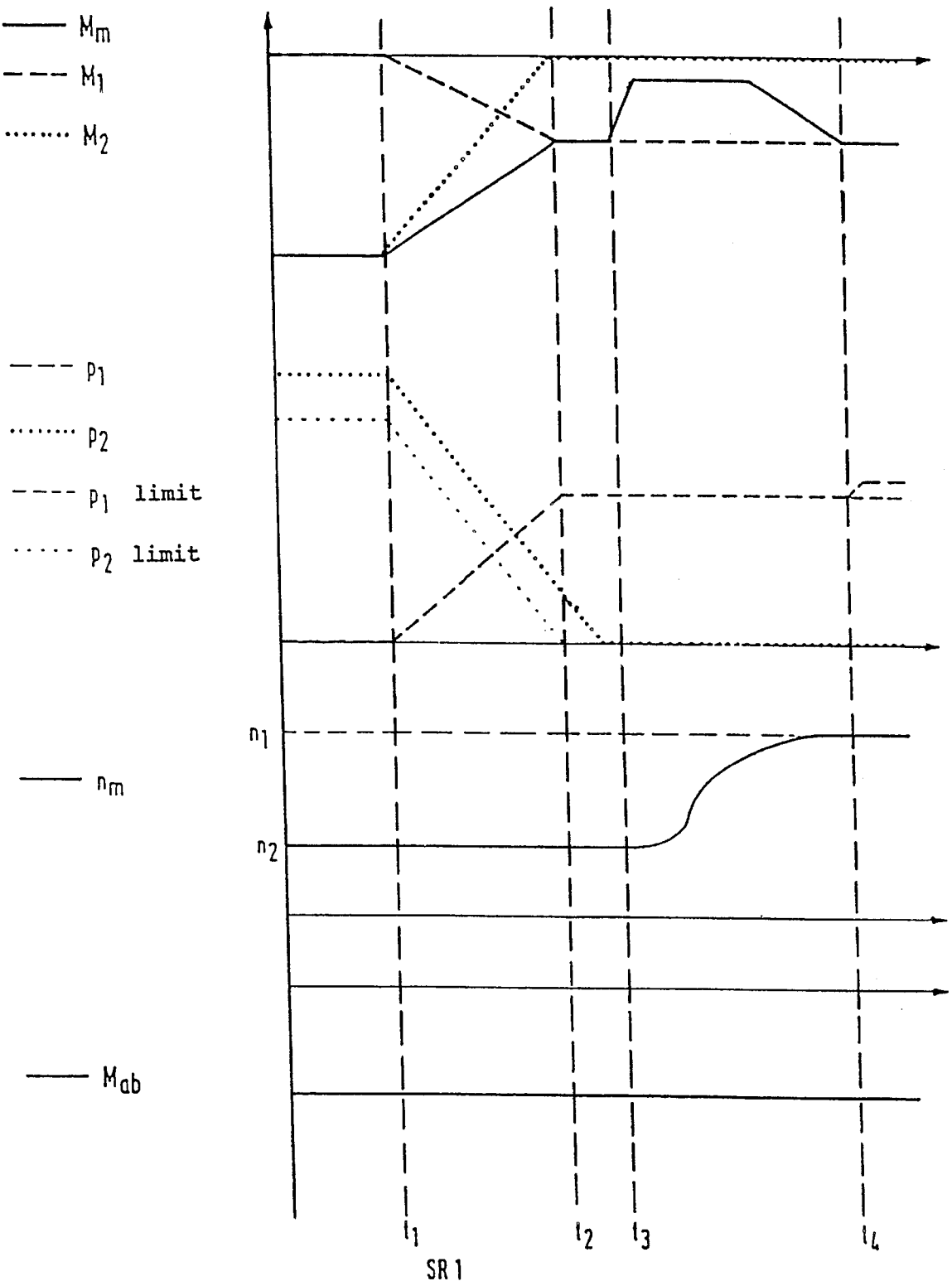
Figure 8:
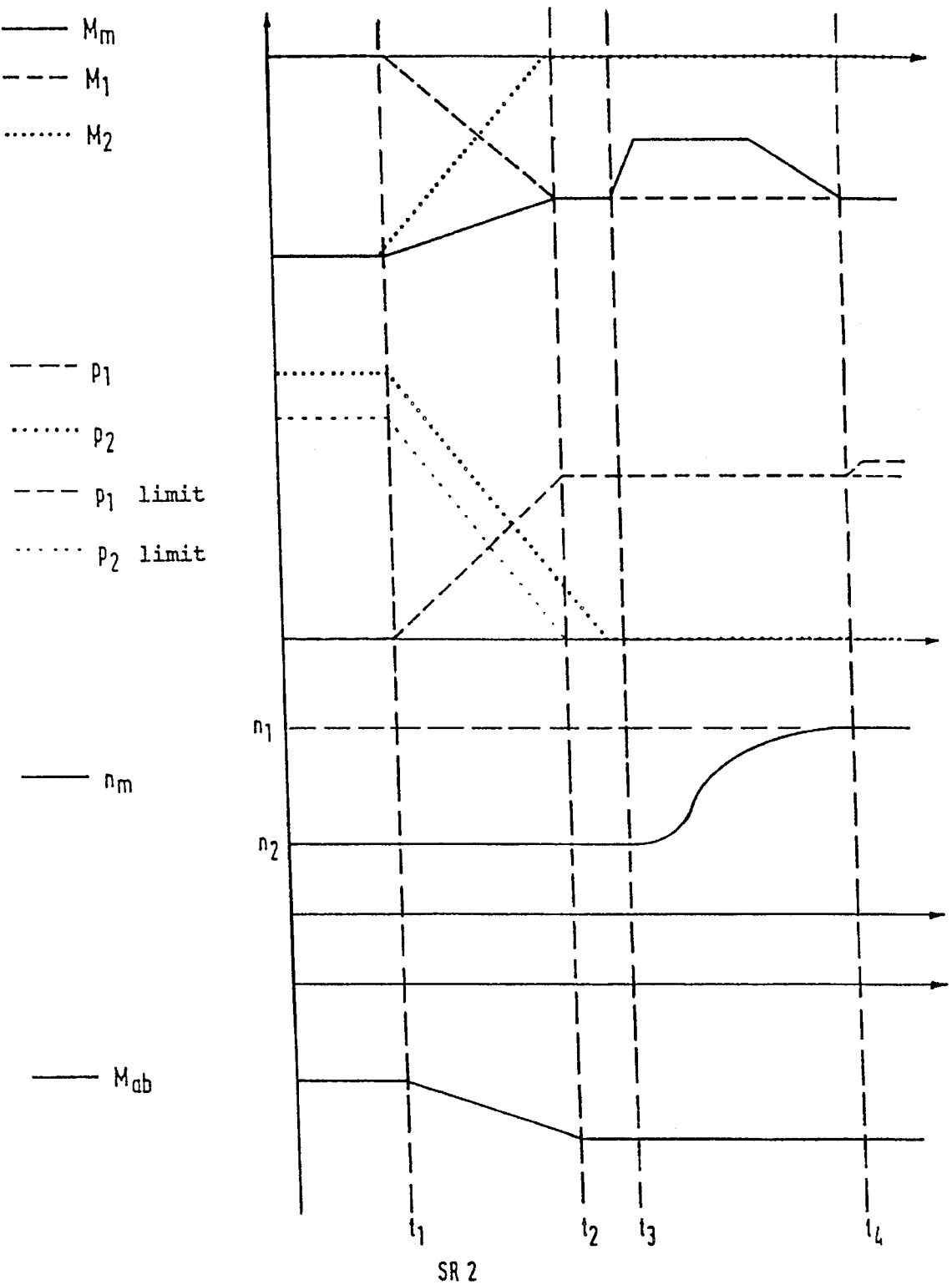
Figure 9:
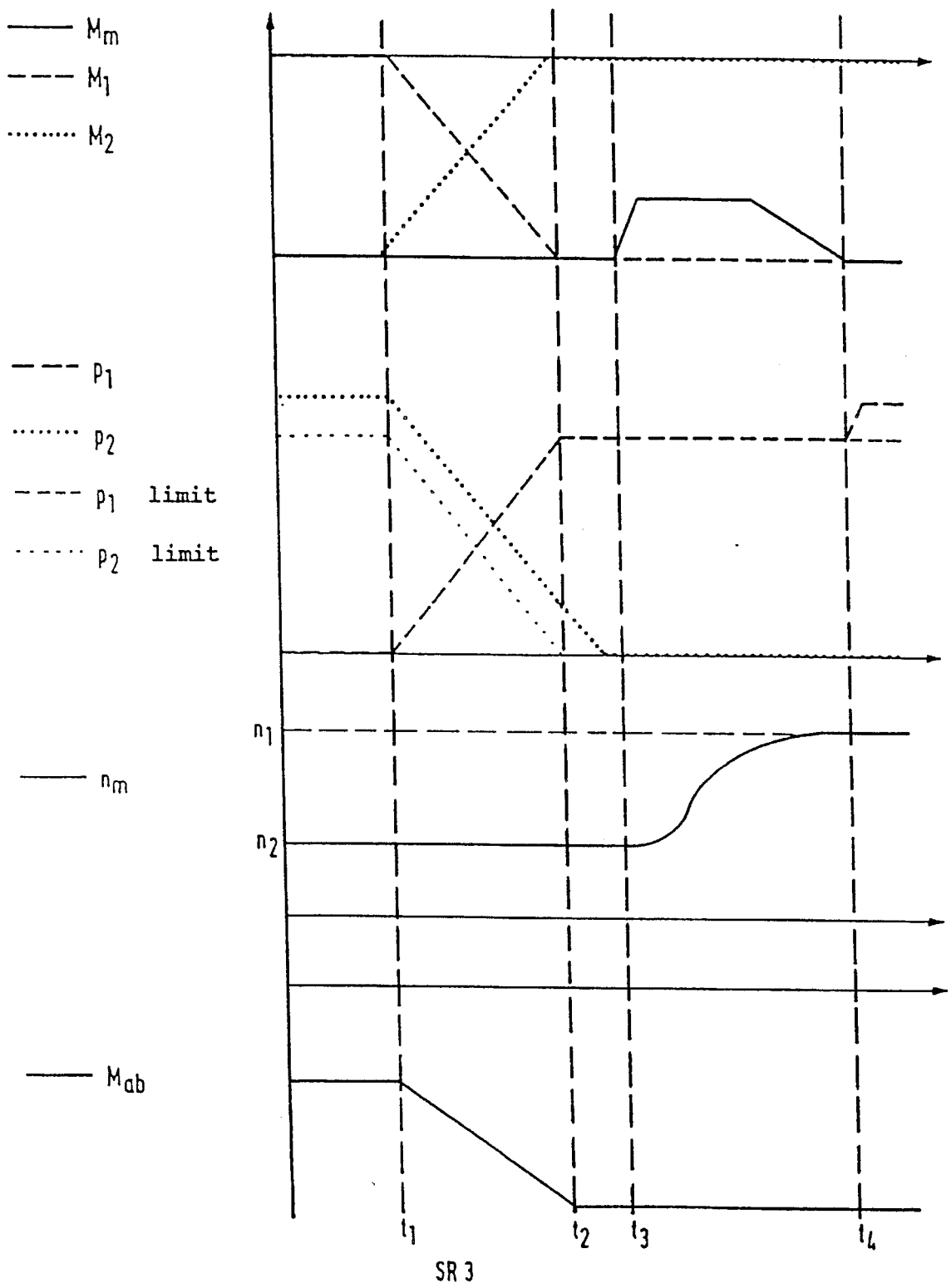

After the engine torque has reached the synchronous point $n_2$, the clutch 16 is immediately released. At the same time, the clutch 17 is engaged. The pressure $P_2$ must be selected according to the equation (5) as $M_2 = M_{min}$ so that the clutch 17 changes to static friction.

b) Shifting down
Case 1 (control sequence SR1):

The engine is in overrun operation before the gear change but the engine torque $M_{m\ act}$ before the gear change is greater than the minimum engine torque (equation (1) applies). The down shift then takes place essentially by reversing the shifting-up operation. The starting situation in the control sequence SR1 shown in FIG. 7 is the selected gear with the transmission ratio $u_2$ with the clutch 17 closed and operating without slippage and the clutch 16 released. For shifting down, in a first phase, the clutch 16 must take up the torque of clutch 17. For this purpose, a pressure is built up in the clutch 16 as a result of which the clutch 17 is correspondingly relieved of load. However, in this phase the clutch 17 continues to operate without slippage, that is, the clutch 16 has a slippage which corresponds to the difference between the two synchronous speeds $n_1$ and $n_2$. A desired torque characteristic of $M_1$ can now be selected by means of $$M_1(t) = f(t) * (M_{ab}/u_1) \quad (15)$$

wherein f(t) is a function of that time which has the value 0 at the time of the start of the gear change, increases continuously to the value 1 and subsequently stays at 1. The pressure in the clutch 16, which transmits the torque $M_1$, is set according to the equation (7). The desired value of the engine torque can be calculated from the equation (10), wherein $M_1$ is to be taken from the equation (15). The clutch 17 operates without slippage. The pressure at the clutch 17 must therefore be kept at least at a minimum level according to equation (5), in which case $M_2$ is calculated according to the equation (11).

As soon as the function f(t) has reached the value 1, $M_2=0$ according to equations (15) and (11). The clutch 17 can now be released without jolt. In order that the release operation proceeds quickly, the pressure $P_2$ during the build-up phase of $P_1$ can be reduced according to the equation (5) to the extent that the clutch 17 operates only just above the adhesion limit. As soon as the clutch 17 is released, phase 2 begins, in which phase the slippage of clutch 16 must be reduced.

The desired value of $M_1$ and thus, according to equation (7), also the desired value of $P_1$ continues to be determined according to equation (15). According to equation (9), a desired value for the engine torque $M_m$ would thus be obtained according to equation (2).

In order to reduce the slippage of the clutch 16, the engine torque must now be increased by an amount $\Delta M_m$ $$M_m = M_1 + \Delta M_m = (1/u_1) * M_{ab} + \Delta M_m \quad (16)$$

wherein $\Delta M_m$ is a function of $(n_1-n_m)$ so that the engine speed changes quickly and smoothly from $n_2$ to $n_1$ as a result of a speed control. Here too, the German patent application P 4,309,903.3 should be referred to. When the engine speed has increased to the value of $n_1$, the gear change can be considered to be finished at the time $t_4$, the pressure $P_1$ is increased by safety quantity $\Delta p$ in order to reliably prevent the clutch 16 from slipping. The variation over time of the variables $P_1$, $M_1$, $P_2$, $M_2$, $M_m$, $M_{ab}$ and of the engine speed $n_m$ is given in FIG. 7 assuming a linear relationship between the pressure and the torque in the clutches having slippage (for example, $M_1 = -k_1 * p_1$) and assuming a function f(t) which increases linearly from 0 to 1.

Case 2 (control sequence SR2):

The engine torque $M_m$ is at its minimum value before the gear change but is above the minimum value after the gear change, that is, $$M_m = M_2 = M_{min} \text{ before the gear change} \quad (17a)$$

$$M_m = M_1 = M_{ab}/u_1 > M_{min} \text{ after the gear change} \quad (17b)$$

In this case, the output torque cannot be kept constant before and after the gear change. In order to nevertheless achieve a jolt-free and smooth gear change, the control is carried out as follows.

The first phase is similar to that in Case 1 (SR1). A desired torque trace for $M_1$ is selected according to the equation (15) as in Case 1. The pressure in the clutch 16, which transmits the torque $M_1$, is set according to the equation (7), also as in Case 1. The desired course of the engine torque is calculated (differently from Case 1) according to $$\begin{aligned} M_m &= M_1(t) + [1 - f(t)] * M_{min} \\ &= f(t) * M_{ab}/u_1 + [1 - f(t)] * M_{min} \end{aligned} \quad (18)$$

wherein f(t) is, as in equation (15), a function of the time which has the value 0 at the time of the start of the gear change, then climbs continuously to the value 1 and subsequently stays at 1. The torque in the clutch 17 can be determined from the equation (9) by inserting $M_1(t)$ and $M_m$. The further steps are identical to Case 1. The variations over time of the control sequence SR2 can be found in FIG. 8.

Case 3 (SR3):

If the engine torque $M_m$ remains at its minimum value $M_{m\ min}$ before and after the shifting down, attempts to keep the output torque constant must be abandoned. In this case, the output torque will decrease after the gear change. The control is similar to that in Case 1 described above. The desired characteristic of the engine torque remains (in contrast to Cases 1 and 2) constant in the first phase (see FIG. 9):

$$M_m = M_{min} \quad (19)$$

$M_1$ is specified for the pressure $P_1$ in the clutch 16 (different from equation (15) according to $$M_1(t) = f(t) * M_{min} \quad (20)$$

so that the gear change is jolt free and there is a smooth transition of the output torque from the value before the gear change to the value after the gear change. The pressure in the clutch 16, which transmits the torque $M_1$, is also set according to equation (7), as in Case 1 (SR1). The torque in the clutch 17 can be determined from the equation (9) by inserting $M_m$ from the equation (19) and $M_1$ from the equation (20). The further procedure in Phase 1 is identical to the Case 1 described. The second phase in this control sequence is also identical with Case 1. The reduction in slippage (increase in the engine speed) by increasing engine torque is carried out according to the equation (16) with $M_1 = M_{min}$, wherein the overrun cutoff is prohibited until the synchronous speed $n_1$ is reached. After the gear-shifting operation is finished, the fuel overrun cutoff is allowed again.

The principle of the above-mentioned controls for shifting up and shifting down during engine overrun operation also applies to conventional transmissions in which the throttle valve and thus the engine torque are set directly by the accelerator pedal. In this case, only the initial value or final value for $M_1$, $M_2$ and $M_m$ need to be replaced by the engine torque, set by the accelerator pedal, before or after the gear change.

In particular, the control of the output torque according to the invention, during an ongoing gear-shifting operation, to a negative torque requirement specified by the driver, is provided in vehicles with automatic power transmission and an electrically actuable throttle valve (so-called E gas) or an electronic diesel control (ETC).

I claim:

1. A method for controlling the output torque ($M_{ab}$) of an automatic transmission during the course of a gear-shifting operation in a motor-operated vehicle equipped with drive wheels and a transmission having at least two gears which can be engaged alternatively by at least two clutches, the method comprising the steps of:

determining, as a first gear-shifting condition under which a shift of gears is to take place, whether the motor vehicle is in a first operating state defined by a positive clutch torque wherein the motor drives the drive wheels (motor traction operation) or in a second operating state defined by a negative clutch torque wherein the drive wheels drive the motor (motor overrun operation);

determining, as a second gear-shifting condition, whether the gear-shifting operation to be controlled is a shift-up operation from a first transmission ratio ($u_1$) to a second transmission ratio ($u_2$) or a shift-down operation from a second transmission ratio ($u_2$) to a first transmission ratio ($u_1$);

selecting at least two control sequences (SH1 to SH3, SR1 to SR3 or ZH, ZR) in dependence upon the first and second gear-shifting conditions;

configuring said control sequences (SH1 to SH3, SR1 to SR3 or ZH, ZR) so that said output torque ($M_{ab}$) during a gear-shifting operation is controlled continuously from the value thereof present in advance of the gear-shifting operation to a value desired after the gear-shifting operation; and, controlling the clutches and the torque ($M_m$) of the vehicle motor in accordance with said at least two control sequences (SH1 to SH3, SR1 to SR3 or ZH, ZR).

2. The method of claim 1, wherein, in the case of the presence of the second operating state with negative clutch torque (motor overrun operation), the method comprises the further steps of: determining, as an additional gear-shifting condition, whether a motor torque ($M_{m\ des}$), which is desired after finishing of the gear-shifting operation, is greater than the minimum motor torque ($M_{n\ min}$) to be generated; and, selecting the control sequences (SH1 to SH3, SR1 to SR3 or ZH, ZR) as a function of said additional gear-shifting condition.

3. The method of claim 2, wherein the motor torque $M_{m\ des}$ desired after finishing of the gear-shifting operation is pregiven at the start of the gear-shifting operation by an accelerator pedal which can be actuated by the driver of the vehicle.

4. The method of claim 3, wherein, as an additional further gear-shifting criterion, it is determined whether the instantaneous motor torque ($M_{min\ act}$) is greater at the start of the gear-shifting operation than the minimum motor torque ($M_{m\ min}$) to be generated; and, said at least two control sequences (SH1 to SH3, SR1 to SR3 or ZH, ZR) are selected as a function of this additional gear-shifting condition.

5. The method of claim 1, wherein the method comprises performing at least one of the following steps (a) to (e):

(a) selecting a first control sequence (SH1) of said control sequences if:
a shift-up operation from a first transmission ratio ($u_1$) to a second transmission ratio ($u_2$) is detected; and,
the motor torque ($M_{m\ des}$) desired after finishing the gear-shifting operation is greater than the minimum motor torque ($M_{m\ min}$) to be generated or equal to the minimum motor torque ($M_{m\ min}$) to be generated;

(b) selecting a second control sequence (SH2, SH3) of said control sequences if:
a shift-up operation from a first transmission ratio ($u_1$) to a second transmission ratio ($u_2$) is detected; and,
the motor torque ($M_{m\ des}$) desired after finishing the gear-shifting operation is less than the minimum motor torque ($M_{m\ min}$) to be generated;

(c) selecting a third control sequence (SR3) of said control sequences if:
a shift-down operation from a second transmission ratio ($u_2$) to a first transmission ratio ($u_1$) is detected; and,
the motor torque ($M_{m\ act}$) present at the start of the gear-shifting operation is equal to the minimum motor torque ($M_{m\ min}$) to be generated; and,
the motor torque ($M_{m\ des}$) desired after finishing the gear-shifting operation is less than the minimum motor torque ($M_{m\ min}$) to be generated; and/or, (d) selecting a fourth control sequence (SR2) of said control sequences if:
a shift-down operation from a second transmission ratio ($u_2$) to a first transmission ratio ($u_1$) is detected; and,
the motor torque ($M_{m\ act}$) which is present at the start of the gear-shifting operation is equal to the minimum motor torque ($M_{m\ min}$) to be generated; and,
the motor torque ($M_{m\ des}$) desired after finishing the gear-shifting operation is greater than the minimum motor torque ($M_{m\ min}$) to be generated; and, (e) selecting a fifth control sequence (SR1) of said control sequences if:
a shift-down operation from a second transmission ratio ($u_2$) to a first transmission ratio ($u_1$) is detected; and,
the motor torque ($M_{m\ act}$) present at the start of the gear-shifting operation is greater than the minimum motor torque ($M_{m\ min}$) to be generated.

6. The method of claim 5, wherein said first control sequence (SH1) includes the following steps:

releasing the first clutch until the motor speed ($n_m$) has essentially reached the synchronous speed ($n_2$) of the second clutch;

essentially simultaneously reducing the motor torque ($M_m$) by a value ($\Delta M_m$) which is essentially proportional to the difference ($n_m - n_2$) between the instantaneous motor speed ($n_m$) and the synchronous speed ($n_2$) of the second clutch;

closing the second clutch up to its slippage-free state as soon as the motor speed ($n_m$) has essentially reached the synchronous speed ($n_2$) of the second clutch;

subsequently again releasing the first clutch with controlled timing up until the complete release of the first clutch; and, simultaneously reducing the motor torque (Mmot) with controlled timing essentially to a value which essentially corresponds to the desired value ($M_{ab\ des}$) of the gear output torque specified by the driver divided by the transmission ratio ($u_2$) of the higher gear.

7. The method of claim 5, wherein the second control sequence (SH2) includes the following steps:

releasing the first clutch with controlled timing;

reducing essentially simultaneously the motor torque ($M_m$) as a function of a value ($\Delta M_m$) which represents the difference ($n_m - n_2$) between the instantaneous motor rpm ($n_m$) and the synchronous rpm ($n_2$) of the second clutch, and as a function of time-controlled release of the first clutch;

closing up the second clutch to its slippage-free state as soon as the motor rpm ($n_m$) has essentially reached the synchronous rpm ($n_2$) of the second clutch;

subsequently releasing the first clutch further with controlled timing until the first clutch is completely released; and, reducing essentially simultaneously the motor torque (Mmot) with controlled timing to a value which corresponds essentially to the desired value ($M_{ab\ des}$) for the transmission output torque inputted by the driver divided by the transmission ratio ($u_2$) of the higher gear; or, wherein the second control sequence (SH3) includes the following steps:

releasing the first clutch with controlled timing while essentially simultaneously reducing the motor torque ($M_m$) with controlled timing to its minimum value ($M_{m\ min}$);

releasing the first clutch when the instantaneous motor rpm ($n_m$) has essentially reached the synchronous rpm ($n_2$) of the second clutch; and, closing the second clutch essentially simultaneously.

8. The method of claim 5, wherein the fifth control sequence (SR1) includes the following steps:

closing the first clutch with controlled timing until the entire motor torque is transmitted by the first clutch, the first clutch 16 operating with a slippage which corresponds approximately to the difference ($n_1-n_2$) of the synchronous speeds of the first and of the second clutch;

releasing the second clutch essentially simultaneously with controlled timing, the first clutch operating without slippage;

increasing the motor torque ($M_m$) essentially simultaneously with controlled timing;

the second clutch being subsequently released completely as soon as the entire torque is transmitted essentially by the first clutch; and, subsequently increasing the motor torque ($M_m$) by a value ($\Delta M_m$) which is essentially proportional to the difference ($n_1-n_m$) between the synchronous speed ($n_1$) of the first clutch and the instantaneous motor speed ($n_m$).

9. The method of claim 5, wherein the fourth control sequence (SR2) includes the following steps:

closing the first clutch with controlled timing until the entire motor torque is transmitted by the first clutch, the first clutch operating with a slippage which corresponds approximately to the difference ($n_1-n_2$) of the synchronous speeds of the first and second clutches;

the second clutch being released essentially simultaneously with controlled timing, the second clutch operating without slippage;

increasing the motor torque ($M_m$) essentially simultaneously with controlled timing starting at the minimum motor torque ($M_{m\ min}$) to be generated;

the second clutch 17 is subsequently released completely as soon as the entire torque is essentially transmitted by the first clutch; and, the motor torque ($M_m$) is subsequently increased by a value (delta$M_m$) which is essentially proportional to the difference ($n_1-n_m$) between the synchronous rpm ($n_1$) of the first clutch and the instantaneous motor rpm ($n_m$).

10. The method of claim 5, wherein the third control sequence (SR3) includes the following steps:

closing the first clutch with controlled timing until the entire motor torque is transmitted by the first clutch operating with a slippage which corresponds approximately to the difference ($n_1-n_2$) of the synchronous rpms of the first and second clutches;

releasing the second clutch essentially simultaneously with controlled timing with the second clutch operating without slippage; and, subsequently increasing the motor torque ($M_m$) by a value ($\Delta M_m$) which is essentially dependent on the difference ($n_1-n_m$) between the synchronous rpm ($n_1$) of the first clutch 16 and the instantaneous motor rpm ($n_m$).

11. The method of claim 1, wherein, in order to determine whether the vehicle is in the first operating state with a positive clutch torque (motor traction operation) or in the second operating state with a negative clutch torque (motor overrun operation), the method includes the steps of:

estimating an indicated actual motor torque (mo_act) from the motor speed ($n_m$) and the motor load taking into account the ignition angle and cylinder shut-offs which may be present;

estimating a motor braking torque (mo_brake) from at least one of the following: the motor load, the motor rpm ($n_m$) and the motor temperature;

determining the entire torque loss (mo_loss) from the estimated motor braking torque (mo_brake) and the torque requirement (mo_aux) of the auxiliary units (for example, climate control system); and, determining the actual clutch torque (mo_clutch_act) as the difference between the indicated actual motor torque (mo_act) and the entire torque loss (mo_loss).

12. The method of claim 1, wherein a torque sensor is mounted on the driveshaft of the vehicle; and, the method includes utilizing the signals of the torque sensor to determine whether the vehicle is in the first operating state with a positive clutch torque (motor traction operation) or in the second operating state with a negative clutch torque (motor overrun operation).

13. An arrangement for controlling the output torque ($M_{ab}$) of an automatic transmission during the course of a gear-shifting operation in a motor-operated vehicle equipped with drive wheels and a transmission having at least two gears which can be engaged alternatively by at least two clutches, the arrangement comprising:

means for determining, as a first gear-shifting condition under which a shift of gears is to take place, whether the motor vehicle is in a first operating state defined by a positive clutch torque wherein the motor drives the drive wheels (motor traction operation) or in a second operating state defined by a negative clutch torque wherein the drive wheels drive the motor (motor overrun operation);

means for determining, as a second gear-shifting condition, whether gear-shifting operation to be controlled is a shift-up operation from a first transmission ratio ($u_1$) to a second transmission ratio ($u_2$) or a shift-down operation from a second transmission ratio ($u_2$) to a first transmission ratio ($u_1$);

means for selecting at least two control sequences (SH1 to SH3, SR1 to SK3 or ZH, ZR) in dependence upon the first and second gear-shifting conditions;

means for configuring said control sequences (SH1 to SH3, SR1 to SR3 or ZH, ZR) so that said output torque ($M_{ab}$) during a gear-shifting operation is controlled continuously from the value thereof present in advance of the gear-shifting operation to a value desired after the gear-shifting operation; and, means for controlling the clutches and the torque ($M_m$) of the vehicle motor in accordance with said at least two control sequences (SH1 to SH3, SR1 to SR3 or ZH, ZR).

14. The method of claim 1, wherein, as an additional further gear-shifting criterion, it is determined whether the instantaneous motor torque ($M_{min\ act}$) is greater at the start of the gear-shifting operation than the minimum motor torque ($M_{m\ min}$) to be generated; and, said at least two control sequences (SH1 to SH3, SR1 to SR3 or ZH, ZR) are selected as a function of this additional gear-shifting condition.

* * * * *

UNITED STATES PATENT AND TRADEMARK OFFICE
CERTIFICATE OF CORRECTION

PATENT NO.   :  5,603,672

DATED        :  February 18, 1997

INVENTOR(S)  :  Hong Zhang

It is certified that error appears in the above-indentified patent and that said Letters Patent is hereby corrected as shown below:

Delete starting from column 2, line 27: from "clutch torque occurs, the control which is gear-shifting" to and including column 3, line 25: "the be controlled is a shifting-up operation from a first" and substitute the following:
-- clutch torque occurs, the control which is described in this application is not suitable for controlling the output torque during the gear shifting operation. The advantage of the invention consists in the fact that a control of the output torque is provided even in the case of a negative clutch torque (engine overrun operation) and the appropriate control sequence is selected depending on whether the vehicle is in the operating state with positive clutch torque or in the operating state with negative clutch torque. In this way, an optimum control of the output torque in all operating conditions of the vehicle is ensured.

In particular, it is provided to maintain the output torque essentially constant during the gear-shifting operation. In the presence of specific operating conditions before or after a gear-shifting operation, the output torque cannot be kept constant; however, by means of the control according to the invention, a jolt-free and gentle transition between the different output torques is made possible.

An advantageous embodiment of the invention provides, in the case of the presence of the operating state with negative clutch torque (engine overrun operation), to determine as additional gear-shifting condition whether a desired engine torque after the finishing of the gear-shifting operation is greater than the minimum engine torque to be generated. The control strategy which is optimal for the respective operating state is selected as a function of this additional gear-shifting operation from the control sequences which are assigned to the operating states with a negative clutch torque. As a result, it is possible to arrive better at the control sequence adapted to the particular operating state. In operating states with negative clutch torque it is possible that the engine operates, before or after the

UNITED STATES PATENT AND TRADEMARK OFFICE
CERTIFICATE OF CORRECTION

PATENT NO. : 5,603,672
DATED : February 18, 1997
INVENTOR(S) : Hong Zhang

It is certified that error appears in the above-indentified patent and that said Letters Patent is hereby corrected as shown below:

gear-shifting operation, with its minimum torque to be generated or has a torque which is greater than the minimum torque to be generated. In the first case, a fuel supply shut-off (overrun shutoff) is normally operating before or after the gear-shifting operation; while, in the other case, the metering of fuel is maintained. If these different facts are considered in the selection of the control sequences, sequences are arrived at which are even better matched to the particular operating state.

Furthermore, it can be provided that the engine torque, which is desired after the end of the gear-shifting program, can be specified at the start of the gear-shifting program by an accelerator pedal actuated by the driver of the vehicle. In the above-mentioned so-called Mastershift method, the driver presets, by means of the accelerator pedal, a desired input drive torque or transmission output torque. Outside of gear-shifting operations, this input drive torque desired by the driver can be converted into a desired engine torque by means of the known transmission ratio and, if appropriate, taking into account the converter slippage. If it is considered that during the generally very short shifting times of automatic transmissions the driver command regarding the input drive torque does, in general, not change significantly, the engine torque desired after the end of the gear-shifting operation can be determined with sufficient accuracy by the input drive torque, specified by the driver at the start of the gear-shifting operation. This has the advantage that during the gear-shifting operation the input drive torque desired by the driver does not have to be continuously observed or measured and adjusted.

Furthermore, it is advantageous to determine as further gear-shifting conditions whether the gear-shifting operation to be controlled is a shifting-up operation from a first --.

UNITED STATES PATENT AND TRADEMARK OFFICE
CERTIFICATE OF CORRECTION

PATENT NO. : 5,603,672
DATED : February 18, 1997
INVENTOR(S) : Hong Zhang

It is certified that error appears in the above-indentified patent and that said Letters Patent is hereby corrected as shown below:

In column 4, line 18: delete "wherein;" and substitute -- wherein: -- therefor.

In column 5, line 66: delete "mo_clutch act" and substitute -- mo_clutch_act -- therefor.

In column 6, line 1: delete "mo_clutch act=mo_act-(mo_brake+mo_aux)" and substitute -- mo_clutch_act = mo_act - (mo_brake + mo_aux)-- therefor.

In column 6, line 43: delete "M$_m$ des" and substitute -- M$_{m\ des}$ -- therefor.

In column 10, line 36: delete "(different from equation (15)" and substitute -- (different from equation (15)) -- therefor.

In column 14, line 58: delete "SK3" and substitute -- SR3 -- therefor.

Signed and Sealed this

Eleventh Day of August 1998

Attest:

BRUCE LEHMAN

*Attesting Officer*                *Commissioner of Patents and Trademarks*